March 17, 1953     S. S. RUBALOFF     2,631,689
CONTINUOUS CHECK STAND
Filed April 23, 1951     2 SHEETS—SHEET 2
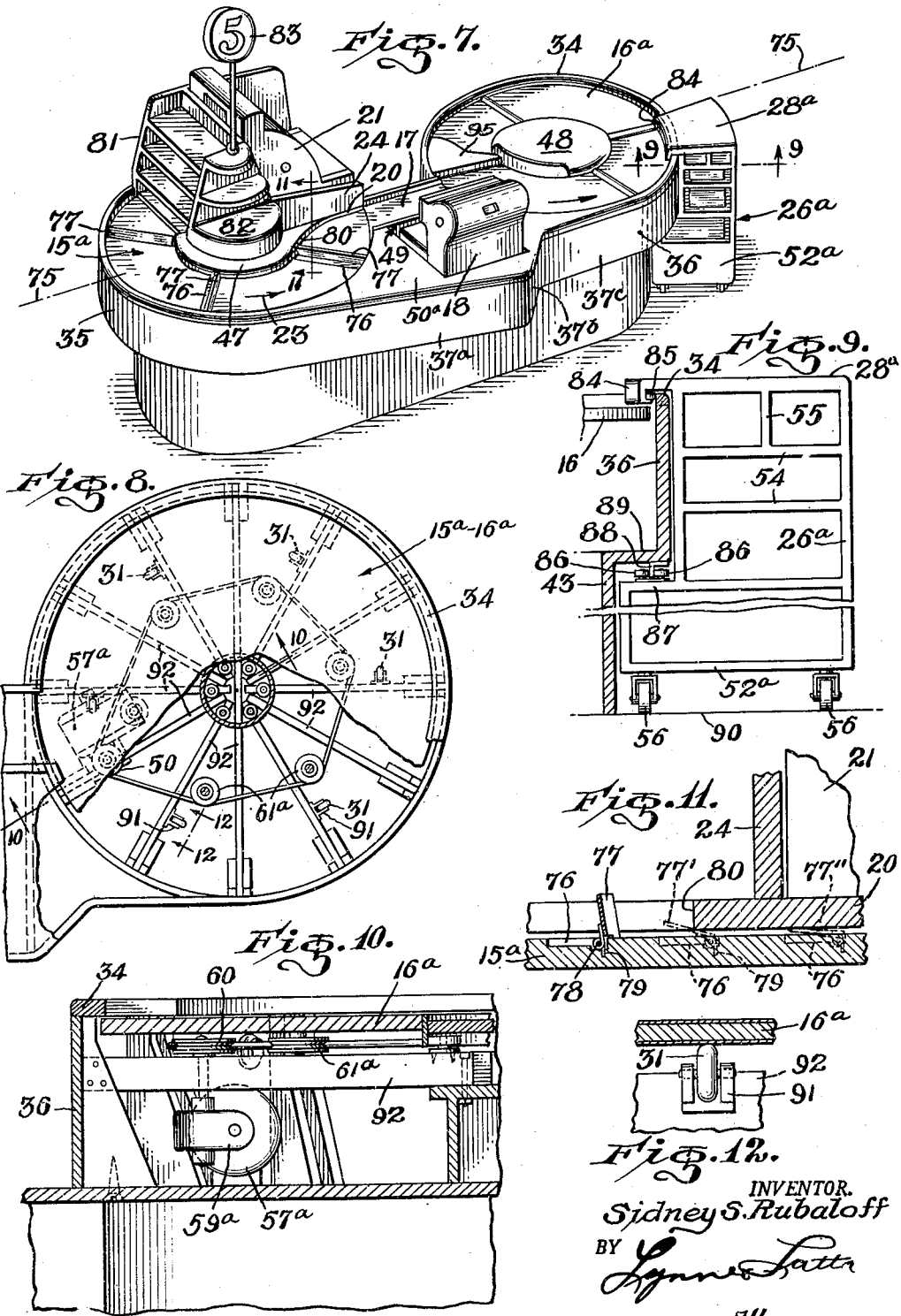
INVENTOR.
Sidney S. Rubaloff
BY
Attorney.

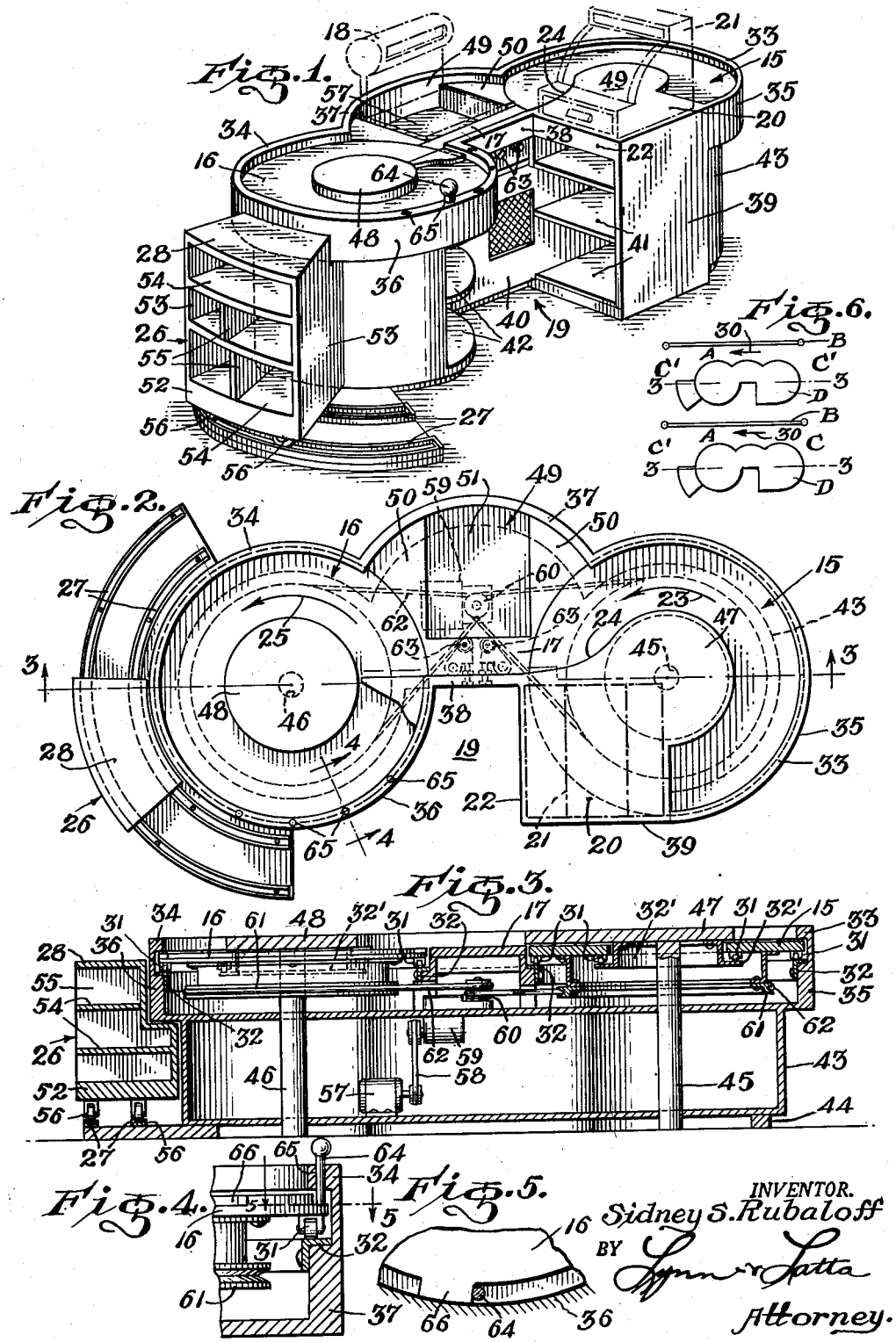

Patented Mar. 17, 1953

2,631,689

UNITED STATES PATENT OFFICE 2,631,689

CONTINUOUS CHECK STAND

Sidney S. Rubaloff, Los Angeles, Calif.

Application April 23, 1951, Serial No. 222,480

9 Claims. (Cl. 186—1)

This invention relates to checking counters (check stands) for self service stores and has as its general object to facilitate the operations of a checking cashier (commonly known as a "checker") in checking out and ringing up on cash register, various articles of merchandise brought to the check stand by the customer.

The primary object of the invention is to speed up the checking out operation, so as to reduce the length of time a customer must stand in line in order to have his purchases checked out. More specifically, the invention aims to provide apparatus for facilitating the checkout operation in such a manner as to attain a very substantial speed-up without increasing the difficulty of the checker's operation. In fact, I find that with the use of the invention it is possible to speed up the check-out operation by as much as 50% (50% more volume in a given period of time) while actually lightening the burden of the cashier.

The basic feature of the invention is the provision of a check stand which is operable to induce and facilitate continuous action by the checker and packer in checking out a series of customer purchases, packing them for transportation, and delivering them to the customer. This is accomplished by providing for a continuous automatic flow of articles to the checker from the point where the customer delivers them to the check stand, and a continuous flow, at the same rate, from the checker to the packer.

A further object of the invention is to provide an apparatus which is of relatively compact construction, providing ample conveyor length to satisfactorily handle the receipt and delivery of articles from the customer to the cashier and the delivery of articles from the cashier to the packer, yet occupying substantially no more floor space than a conventional check stand, and of such proportions and arrangement as to be adaptable to incorporation in an arrangement of a series of check stands separated by customer exit aisles, with the various units of the check stand disposed in proper sequence to provide for correlated movements of the goods and customers from the merchandise enclosure to the outer corridor where the customer receives the sacked or boxed merchandise. This is best accomplished by utilizing a pair of circular conveyors, having power operated means for continuously driving them in relatively slow, synchronized rotation, said conveyors being spaced apart, with a spacing such as to: (a) provide for an intervening fixed counter surface sufficient in area for handling overflow of accumulated articles but short enough so that the cashier may transfer articles from one (circular) conveyor to the other without overreaching; (b) providing, between the conveyors, a space that is adequate, but not too large, in which the operator may stand. Thus it is possible, by the use of circular conveyors of moderate diameter (e. g. in the neighborhood of four to five feet) to provide a pair of circular, annular conveyors having adequate circumferential extent to handle a fairly heavy flow of articles past the cashier, and, in fact, sufficient so that a substantial portion of area of the incoming (circular) conveyor (e. g. between one fourth and one third) may be covered by the cash register.

A specific object of the invention is to provide an apparatus which induces the customer to assist the checker in the checkout operation. This is attained by utilizing a pre-positioning circular conveyor upon which the customer places the articles purchased, the circular conveyor functioning to carry the articles to a pre-determined point where they may be readily picked up by the checker. Thus the necessity for the checker reaching over the counter, lifting the articles out of the customer's service cart, and placing them upon the counter prior to commencing the checking operation, is eliminated.

The invention is predicated upon the basic principle of mechanically and continuously moving a series of articles to a point within easy reach of the checker, at a pre-determined rate of travel which is such that an alert, efficient operator can easily check the articles out at the pre-determined tempo, so long as she is not required to perform extraneous movements beyond the simple movement of picking up the articles with one hand, transporting them a very short distance (in the neighborhood of 18 inches), and simultaneously ringing up the prices of the articles on the cash register with the other hand. In the preferred arrangement, the apparatus is so constructed and arranged that the operator may directly face the cash register, operating the same with the right hand, while picking up the articles with the left hand. Accordingly, the invention provides for pre-positioning the articles at a pick-up point which is located exactly at the natural position of the left hand when the operator is directly in front of the cash register and facing the same.

In order that the operator may be required to manually move the articles only a short distance, the invention provides a second circular conveyor for carrying the articles away from the vicinity of the cashier and delivering them to a second operator whose job is to pack them in sacks, cartons, etc.

The invention further provides for arresting the conveyor induced movement of the articles at the pre-determined point where the checker picks them up, with the following advantageous results: (a) the checker may pick up all articles at the same fixed point; and (b) in the event the flow of articles to the pick-up point temporarily exceeds the removal of the articles therefrom by the checker, the articles will accumulate at the pick-up point until the checker can catch up. This function of the apparatus is particularly important when a number of articles, such as fruit and vegetables, which have to be weighed, are presented at the pickup point simultaneously. With the foregoing in mind, a further object of the invention is to provide an apparatus combining, with a circular conveyor for moving articles to a pick-up point, a means for arresting the movement of the articles at the pickup point without arresting the movement of the circular conveyor, so as to allow a temporary accumulation of articles at the pick-up point. The invention further provides for stopping the movement of the circular conveyor to avoid an over-accumulation at the pickup point.

The invention further provides for sufficient separation of the two circular conveyors to avoid any automatic movement of articles from the first to the second conveyor, thereby to avoid any escape of an article past the cashier, onto the delivery conveyor without being registered. As a preferred means to this end, the invention provides a relatively short stationary counter bridging the space between the two circular conveyors, providing a fixed supporting surface lying in a common plane with the supporting surfaces of the respective circular conveyors, whereby the operator may, if desired, simply slide the articles from the first to the second circular conveyor, and whereby any slight excess of accumulating articles may overflow onto this fixed supporting surface. The invention further provides for the location of this fixed, bridging supporting surface, directly in front of the weighing scales, to facilitate the registering of an accumulation of articles that have to be weighed. The invention further utilizes the length of this fixed intermediate supporting surface to determine the dimension of the space in which the operator stands.

A further object is to provide an apparatus having a pair of circular, annular conveyors so arranged, in connection with a cash register, that the incoming conveyor will continuously move the articles to be checked, around to a pickup point where they are moving directly toward one side of the cash register, in a direction of movement substantially at right angles to the direction in which the above mentioned intermediate fixed supporting surface extends from the incoming circular conveyor, so that the arresting of the articles at the pickup point may be accomplished by a barrier located directly adjacent the one side of the cash register and substantially in alignment with the intervening fixed supporting surface.

A further object is to provide, in combination with a pair of circular conveyors including an incoming and a delivery conveyor, a bag holding rack movably attached to the supporting structure of the delivery conveyor for arcuate movement around the center thereof, whereby the packer may select a preferred position about the circumference of the delivery conveyor and may adjust the bag supporting rack to a convenient location adjacent the position thus selected.

Other objects are to provide an apparatus such as that specified, which is of relatively simple and inexpensive construction and which has a relatively simple arrangement of mechanism for driving the two conveyors in synchronized movement.

Other objects will become apparent in the ensuing specifications and appended drawings in which:

Fig. 1 is a perspective view of a checking stand embodying the invention, viewed from the cashier's side thereof;

Fig. 2 is a plan view of the same;

Fig. 3 is a vertical longitudinal sectional view thereof taken on the line 3—3 of Fig. 2;

Fig. 4 is a detailed vertical sectional view thereof taken on the line 4—4 of Fig. 2;

Fig. 5 is a detailed horizontal sectional view taken on the line 5—5 of Fig. 4;

Fig. 6 is diagrammatic view of an arrangement for a plurality of check stands;

Fig. 7 is a perspective view of a checking stand embodying a somewhat modified (preferred) form of the invention, viewed from the customer's side of the stand;

Fig. 8 is a plan view of the circular delivery conveyor of the same, with parts broken away to show the drive mechanism thereof;

Fig. 9 is a radial sectional view through a portion of the circular delivery conveyor of the same, showing, in elevation, the bag stand;

Fig. 10 is a detail radial sectional view taken on the line 10—10 of Fig. 8, illustrating a portion of the drive mechanism;

Fig. 11 is a detail vertical sectional view taken on the line 11—11 of Fig. 7; and Fig. 12 is a detail vertical sectional view taken on the line 12—12 of Fig. 8.

*Major features*

As an example of one form in which the invention may be embodied, I have shown in Figs. 1 to 5 inclusive a check stand embodying, in general a pair of circular annular conveyors consisting in an incoming conveyor 15 and a delivery conveyor 16 separated by a fixed bridging counter 17 extending generally along the common diameter indicated by the broken section line 3—3 in Fig. 2. Fixed bridging counter 17 is relatively narrow, having a width which may range from 8 to 12 inches, and in the preferred arrangement, is disposed with one side thereof substantially at the common diameter 3—3 in Fig. 2. On one side of the fixed bridging counter 17 is a support for a weighing scale 18 (shown in broken lines in Fig. 1), and on the other side of the fixed bridging counter 17 is an open space 19 between the two conveyors, in which open space the checker stands. One side of the checker's space 19 (adjacent the incoming circular conveyor 15) is defined by the cash register stand 20, which may be rectangular to correspond to the shape of the cash register base. The cash register is indicated by broken lines at 21 in Figs. 1 and 2. The cash register is positioned facing the checker's space 19, with the front edge thereof arranged along the side 22 of register stand 20 (which defines one side of operator's space 19). Side 22 is disposed transversely to common diameter 3—3 in Fig. 2, and the left side of the cash register is arranged near and parallel to the common diameter 3—3 in Fig. 2.

The checker, when operating, stands in the checker's space 19 facing the cash register 21, with the left hand over the fixed bridging counter 17. The circular conveyor 15 rotates (counterclockwise as viewed in Fig. 2 and as indicated by arrow 23) so as to carry the articles supported thereby towards the checker, until such articles are arrested by a barrier 24 (one side of cash register stand 20) which is roughly parallel to common diameter 3—3 and adjacent the left side of register 21. The left side of the register could if desired be employed as the barrier. The barrier 24 thus is substantially aligned with the near side of bridging counter 17, so that the following results may be attained: (a) at the end of their travel on circular incoming conveyor 15, the articles are moving directly toward the register and are arrested at the left side of the register, immediately ahead of the checker's left hand in a position where, without over-reaching, the checker can grasp them and, moving the left hand rearwardly, move them onto and across the bridging counter 17 to the circular delivery conveyor 16. The movement of the checker's left hand is thus a natural one, with the left arm swinging naturally along the left side of the body, whereby a minimum of effort is required for shifting the articles from one circular conveyor to the other, and consequently the checker tires much less readily than in operating a conventional check stand.

Circular delivery conveyor 16 rotates in the same direction as incoming conveyor 15, whereby the articles transferred thereto from the bridging counter 17 will move away from the operator as indicated by arrow 25, thence around and behind the operator.

A bag rack 26, of arcuate shape conforming to the marginal contour of the rim of circular delivery conveyor 16, is mounted for arcuate movement about the axis of conveyor 16, upon suitable track means 27. A packer stands in a position adjacent the end of the apparatus, such as that indicated by the reference character C. The bag rack 26 has a flat table top 28 providing a support for the bag or carton into which the merchandise is being packed. As the packer finishes the packing of the bag or carton, he places it in a delivery cart adjacent the end of the apparatus, or hands it to the customer, who will normally stand at the position indicated at C'.

At this point it may be noted that a series of the check stands may be arranged as indicated in Fig. 6, with customer exit aisles A located between the respective check stand units D and intervening rails B disposed parallel to the common diameter 3—3. The customers leave the merchandise enclosure through the aisles A, travelling in the directions indicated by arrows 30, stopping at the positions indicated at C to transfer their purchases from the customer service cart to the incoming conveyor 15, and stopping at the positions C' to receive the packaged articles from the packer.

*Structural details—Figs. 1–5*

Conveyors 15, 16 are in the form of flat circular rings, suitably supported upon rollers 31 attached to their undersides and travelling upon annular tracks 32, 32'. Inner and outer edges are covered respectively by annular rim members 33, 34 constituting the upper portions of cylindrical skirts 35, 36, the latter forming respective end portions of the fixed structure of the stand. Skirts 35, 36 each extend through arcs of less than a full circle, being connected by a bridging wall 37 opposite bridging counter 17, on the outer side thereof, and by a bridging wall 38 which forms one extremity of the checker's space 19 and which joins the side 22 of the cash register stand to the adjacent portion of skirt 36. Skirt 35 merges with a flat vertical panel 39 the upper extremity of which defines the outer side of cash register stand 20. Below and parallel to bridging wall 38 is a vertical wall 40, which extends in spaced, parallel relation to panel 39 and is connected thereto by a series of shelves 41 for storing articles of merchandise that are rejected by the customer or the checker during the checking process. On the other side of checker's space 19, a series of rounded shelves 42 may be utilized for a similar or other purpose.

A skirt structure 43, following the contour of skirt members 35, 36 but offset inwardly therefrom, extends therefrom to the base upon which the stand is supported. Central post supports 45, 46 are utilized to support the semi-circular and circular island members 47, 48 which cover or join the inner margins of circular conveyors 15, 16. Track members 32' are hung from the under sides of islands 47, 48, whereas track members 32 are supported in skirt members 35, 36. Island 47 constitutes an extension of register stand 20.

It will now be apparent that the margins of island members 47, 48 cooperate with rim members 33, 34 and the moving upper surfaces of circular conveyors 15, 16, to define annular channels for guiding the articles of merchandise in their respective paths of movement 23, 25.

Scales 18 are supported in a well 49 defined between bridging counter 17, bridging skirt member 37, a pair of generally triangular shaped fixed supporting surfaces 50, and a fixed bottom member 51 upon which the scales rest. Fixed supporting surfaces 50 may be used to temporarily support arrested articles, as desired.

Bag rack 26 includes the table top member 28, a base 52, and a pair of outwardly diverging side members 53, plus suitable shelves 54 and partitions 55 for defining a series of bag compartments opening outwardly. On the under side of base 52 are mounted rollers 56 which travel in the track 27.

Suitable mechanism for driving conveyors 15, 16, is provided. In the arrangement shown in Fig. 3, such mechanism includes an electric motor 57 connected by a belt drive 58 to a geared unit 59 having an upwardly extending capstan driving a pair of drive pulleys 60 which are aligned with ring pulleys 61 attached to the underside of respective conveyors 15, 16. Drive pulleys 60 are drivingly connected to pulleys 61 by belts 62. Gear unit 59 is located beneath scales well 49, sufficiently away from the inner extremity of checker's space 19 so that belts 62 will not intersect said space. Suitable belt tightener units 63 are disposed directly beneath bridging counter 17, positioned to act against respective reaches of belts 62.

Belts 62 provide a drive that may be caused to slip in order that the movement of one or both conveyors may, if desired, be arrested temporarily, without stopping the drive mechanism. Means for arresting the movement of conveyor 16 is provided, in the form of a stop pin 64 slidably mounted in a vertical bore 65 (Fig. 4) in rim 34 and adapted to be moved downwardly to bring its lower end to a position blocking the path of rotation of a radially extending lug 66 on the periphery of conveyor 16 (Fig. 5).

Preferred form—Figs. 7–12

Figs. 7–12 inclusive disclose a somewhat modified form of the check stand described above. The major features are the same, and the reference characters used to denote such similar parts, are the same in Figs. 7–12 inclusive as in Figs. 1–5, inclusive. A description of such parts will not be repeated.

In this form of the invention, instead of the arcuate bridging skirt member 37, the invention provides a bridging skirt including a portion 37a which is tangent to skirt 35 and extends, at a relatively small angle of divergence from common diameter 75, to a point directly behind scales 18, and thence with a relatively sharp offset 37b, to a straight portion 37c, parallel to diameter 75, which joins skirt 37. This design offers less restriction to the movement of the customer through aisle A, and provides a somewhat greater area 59a of fixed overflow counter space to receive temporarily accumulating overflow from the incoming conveyor 15 at the barrier 24.

Circular conveyors 15a, 16a are provided in their upper spaces with radially extending depressions 76, and with divider strips 77 each hinged at one side, by a hinge 78, to one side of a corresponding depression 76, so that it may fold into the depression in order to pass beneath the fixed register stand 20. A suitable mousetrap type spring 79, coiled about the pin of hinge 78, acts between a respective conveyor and divider strip 77 to urge the latter upwardly to an angle of low inclination approximately as indicated at 77′ in Fig. 11. Thus the customer may readily insert the fingers beneath the free edge of the divider strip and lift it upwardly to an upstanding position as shown in full lines in Fig. 11. The purpose of the divider strip is to provide for separation of the articles of one customer from those of a following customer.

The divider strips 77 are automatically depressed by contact of their inner ends with the lower edge of a camming member 80 which extends arcuately between stand 20 and the periphery of island member 47, substantially tangent to both. The divider strip is depressed until it may pass beneath the stand 20 in the position indicated at 77″ (Fig. 11).

Camming member 80 also functions to direct the articles on conveyor 15a toward bridging counter 17, although not to the extent of shoving them across counter 17.

A barrier 95, fixed to skirt 36 above conveyor 16a, prevents recirculation of articles thereon.

Another feature of improvement in this form of the invention is the extension of register stand 20 sufficiently to support a rack 81 for candy, gum, or the like. I find that such extended area of the register stand, occupying somewhat more than one quadrant (quarter) of the area above conveyor 15a, leaves adequate room for the customer to load his articles onto the conveyor 15a at the inner end of the apparatus. Thus space is conserved and utilized to a maximum degree. The space above island 47 may be utilized by a pedestal 82 for a sign 83 bearing the position number of the particular check stand in a series of stands.

Bag rack 26a differs from bag rack 26 in having a lip 84 constituting an extension of its top member 28a, lip member 84 overhanging rim 34, having suitable rollers 85 bearing against rim 34 to assist in guiding the bag rack 26a in arcuate adjustment about conveyor 16a. Additional guide roller means are provided in the form of rollers 86 mounted upon the upper side of an inward offset 87 of base member 52a, and engaging in an arcuate track 88 secured to the under side of an offset wall 89 which connects skirt member 36 to skirt member 43.

With this arrangement, the necessity for tracks 27 is eliminated, and rollers 56 bear directly upon the floor 90. This avoids obstruction of the floor space around conveyor 15.

Conveyor supporting rollers 31 (Fig. 12) are mounted in brackets 91 secured to horizontal frame members 92, and bear against the underside of conveyors 15a, 16a respectively. Frame members 92 may extend radially as indicated in Fig. 8.

Figs. 8 and 10 illustrate a modified driving arrangement, in which instead of ring pulleys 61, a series of pulleys 61a are mounted on the lower sides of the respective conveyors 15a, 16a. Individual drive units for each of the conveyors are provided, capstan pulleys 60 thereof being disposed radially beyond the paths of movement of pulleys 61a sufficiently to be cleared thereby as the latter swing around in circular orbits. Gear units 59a are, in this form of the invention, directly attached to drive motors 57a, which are each mounted between a pair of the frame members 92.

Operation

In the use of the apparatus, the customer, approaching from within the merchandise enclosure, reaches position C, where he transfers his purchases from the customer's cart onto conveyor 15a, gradually as the latter rotates. If a preceding customer's articles are already on the conveyor, the new arrival may raise a divider strip 77 behind the other's articles, so as to separate the two purchases. He then proceeds to place his articles upon the conveyor 15 as the latter gradually moves ahead.

The checker, ringing up the purchases of the previous customer, may readily note the division between the two purchases by the presence of the raised divider strip 77, and accordingly, total the previous purchase and clear the conveyor 15a ahead of the raised divider strip.

The articles, moving continuously in the path indicated by arrow 23 of Fig. 2, will travel from position C behind the register around in a path paralleling the general path of movement of the customer through the exit aisle A as indicated by arrow 30, and then will move inwardly until they are directly approaching the left side of register 21. As circular conveyor 15a moves under register stand 20, the articles will be arrested against the barrier 24, which is disposed radially and normal to the path of travel of the articles. At the point thus arrested, the articles may be picked up by the left hand of the checker as he stands facing the register 21, or may simply be slid horizontally onto the fixed bridging counter 17. Articles that must be weighed are then directly in front of scales 18, and the checker, by pivoting slightly to the left, may quickly place them on the scales and thence back upon counter 17, weighing them and registering them simultaneously. At this point it may be noted that the checker, facing the register 21, has the right hand in a normal, unstrained position for operating the register simultaneously with the use of the left hand to transfer the articles across fixed bridging counter 17 onto the adjacent area of delivery conveyor 16 behind him. The articles then move away from the checker in the path indicated by arrow 25, coming around to the position P where the packer stands. The island 48 provides a supporting surface upon which the packer may place articles that are easily damaged while he places the less perishable articles into the container, until he can remove the articles from island 48 and place them on top of the articles in the container. The packer may stand either behind or ahead of the bag stand 26 or 26a, as desired, in a position convenient for transferring the articles from the conveyor 16a to a receptacle supported upon table top 28a of the bag stand. The customer, reaching position C', is at the outlet of exit aisle A in a position to receive the filled receptacles from the packer, or to wheel away the delivery cart into which the packer may have placed them.

It will now be apparent that the invention provides for a steady, continuous, free flow of articles and customers from one end of the check stand to the other, and for continuous operation of the checker with minimum effort, together with continuous packaging operation by the packer. I find, in actual practice, that both checker and packer may keep busy with rapid operations at a rate anywhere from 33⅓% to 50% faster than the operations of the most efficient checkers and packers using the conventional check stands. Surprisingly, a majority of cashiers assert that with the use of my apparatus, they actually feel a great deal more rested at the end of a day than in using the conventional checking stands.

The operation of the apparatus is characterized particularly by:

A. Prepositioning of the articles at the left side of the cash register where they may most conveniently be grasped by the checker without reaching and without effort. Such prepositioning includes, as a very important element, the cooperation of the customer in lifting the articles out of the shoppers' cart and placing them upon the conveyor 15a ahead of the prepositioning point, thus completely eliminating the necessity for the checker lifting the articles out of the cart and placing them upon the check stand. The operation of the apparatus is such as to induce full cooperation by the customer in this respect, and I find that the customer will exert care to arrange the articles in a substantially uniform distribution upon conveyor 15a without piling them up, whereby they continue to arrive at the prepositioning point at a substantially uniform rate.

B. Continuous flow of the articles to the register, thence across the fixed bridging counter 17, and upon conveyor 16a around to the packer. Such continuous flow includes the manual transfer of the articles across fixed bridging counter 17, which permits the checker to adjust the flow at this point to correspond to his registering operation. An important element of this continuous flow of articles is the timing of the conveyors 15a, 16a for rotation at a fixed, preselected rate, such that, where a steady stream of customers is passing through the exit aisle A, the increase of from 33⅓% to 50% in the rate of handling, referred to above, is automatically attained.

C. Automatic correlation of the operations of the customer, checker and the packer, by the mechanical hook-up of conveyors 15a, 16a to a common or synchronized driving apparatus. An important feature of the automatic characteristic is the automatic arresting of the articles at barrier 24, and the provision of overflow space 50, 50a, 17, onto which the articles may overflow whenever there is a temporary accumulation of articles at barrier 24. In this connection it is to be noted that supporting surfaces 17, 50a, 15a, 16a are all disposed in a common plane so that the articles may be readily slid from one surface to the other without lifting them if the operator prefers. It may also be noted at this point that the weighing platform of scales 18 is substantially on a level with the supporting surfaces, to minimize lifting of the articles by the cashier when weighing them. This is provided for by the well 49, which is at the proper depth to accomplish the desired result.

I claim:

1. A checkstand comprising a generally closed frame, a pair of horizontally spaced and horizontally disposed circular counters rotatably mounted in opposite ends of said frame in the upper portion thereof and defining a predominant portion of the upper surface of said stand, drive means for rotating said counters generally simultaneously at the same speed, a fixed counter mounted on said frame between said circular counters and having an upper flat surface flush with the surfaces of said circular counters at either end thereof, said end portions of said fixed counter being adjacent and concavely shaped to conform to the outer edges of the respective circular counters whereby articles may be slid manually from one circular counter to the other over said fixed counter, and guide means on the frame extending substantially around and above the outermost margins of said circular counters and said fixed counter for preventing displacement and lateral shifting of merchandise placed thereon.

2. A checkstand as defined in claim 1, said drive means normally rotating said circular counters in the same rotative direction, a stationary island mounted on the frame and having a flat upper surface disposed slightly above one of said circular counters covering the central portion and a quadrant thereof.

3. A checkstand as defined in claim 2, wherein said one circular counter is formed with an upper flat surface, said circular counter being formed with radially extending spaced depressions and divider strips hingedly mounted in said depressions respectively and being spring-urged into an upright position above the plane of the surface of said circular counter in the direction of rotation thereof, said quadrant portion defining an abutment for the engagement of said dividers and depressing said dividers during their passage thereunder.

4. A checkstand as defined in claim 2, wherein the upper surface of said one counter rotates beneath said stationary island and wherein one edge of said stationary island towards which said one counter rotates is substantially radially disposed relative to said one circular counter and is in a line with the guide means at one side of said stationary counter, and wherein said one side of said stationary counter is in general alignment with the centers of said circular counters.

5. A checkstand as defined in claim 4, including an inwardly extending guide stop means portion supported on the frame above said other circular counter in the outer annular portion thereof to deposit merchandise disposed upon said annular portion from making a complete revolution to a position adjacent said fixed counter.

6. A checkstand as defined in claim 4, wherein the frame is formed with a recess outwardly of the other side of said stationary counter to receive and accommodate the lower portion of a conventional scale whereby the weighing surface of said scale is approximately flush with the surface of said fixed counter, said quadrant portion adapted to receive a cash register thereon, and said frame adjacent said one side of said stationary counter being recessed laterally inwardly to accommodate a worker positioned adjacent said stationary counter at one said side thereof.

7. A checkstand as defined in claim 1, one of said circular counters having a stationary circular central portion non-rotatably secured on the frame and dividing said one counter into a central stationary portion, and an annular rotatable portion therearound, said stationary central portion and said annular portion having upper flat surfaces in substantially flush relationship to one another.

8. A checkstand as defined in claim 1, wherein a stationary island is mounted in the frame centrally of each of said circular counters respectively, so as to divide each of said counters into a central stationary island portion and a substantially annular outer portion.

9. A checkstand as defined in claim 1, including a bag rack having an arcuate inner side fitted to the periphery of one of said circular counters and said frame and having supporting rollers for travelling on a floor surface, said stand including fixed skirts surrounding an outer segment of said latter counter and having rims extending above the upper surfaces thereof, said bag rack having a flange overhanging the guide means of said latter counter and provided with rollers engaging the inner side thereof to guide said bag rack at fixed radial spacing from said latter circular counter.

SIDNEY S. RUBALOFF.

REFERENCES CITED

The following references are of record in the file of this patent:

UNITED STATES PATENTS

| Number | Name | Date |
|---|---|---|
| 1,071,004 | Goodrich | Aug. 19, 1913 |
| 1,090,713 | Hildenbrand | Mar. 17, 1914 |
| 2,237,080 | Muse | Apr. 1, 1941 |
| 2,317,438 | Bradley | Apr. 27, 1943 |